United States Patent [19]
Hickman

[11] 3,917,427
[45] Nov. 4, 1975

[54] DRILL GUIDES

[75] Inventor: Ronald Price Hickman, Waltham Abbey, England

[73] Assignee: Inventec International Limited, St. Peterport, Guernsey (Channel Is.)

[22] Filed: Aug. 19, 1974

[21] Appl. No.: 498,530

[30] Foreign Application Priority Data
Aug. 20, 1973 United Kingdom............... 39317/73
Apr. 8, 1974 United Kingdom............... 15519/74

[52] U.S. Cl.................................... 408/72; 33/189
[51] Int. Cl.²......................................... B23B 49/00
[58] Field of Search..................... 408/72, 241, 115; 33/185 R, 189

[56] References Cited
UNITED STATES PATENTS
| | | | |
|---|---|---|---|
| 3,064,504 | 11/1962 | Jarboe................................. | 408/72 |
| 3,775,020 | 11/1973 | Stoutenberg....................... | 408/115 |
| 3,804,546 | 4/1974 | Boyajian............................ | 408/115 |

*Primary Examiner*—Gil Weidenfeld
*Attorney, Agent, or Firm*—Brumbaugh, Graves, Donohue & Raymond

[57] ABSTRACT

A drill guide has a body providing a location for a readily removable guide sleeve formed in two halves. Mechanism causes the halves to open to enable the halves to be placed around a drill bit.

18 Claims, 13 Drawing Figures

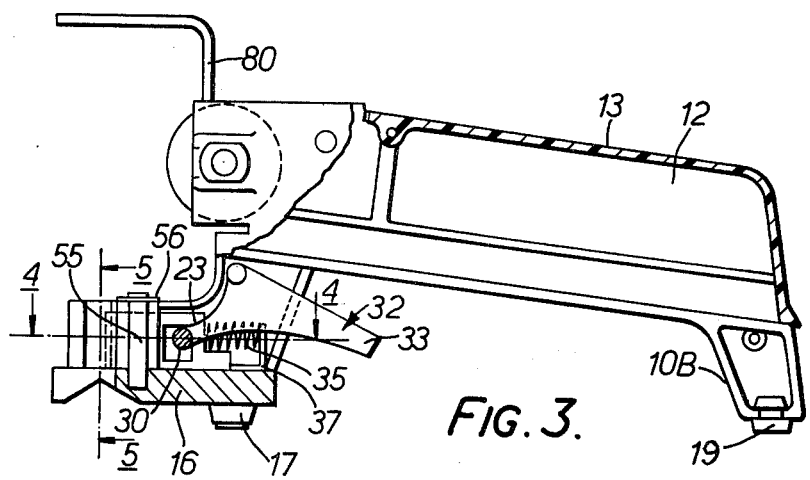
FIG. 3.
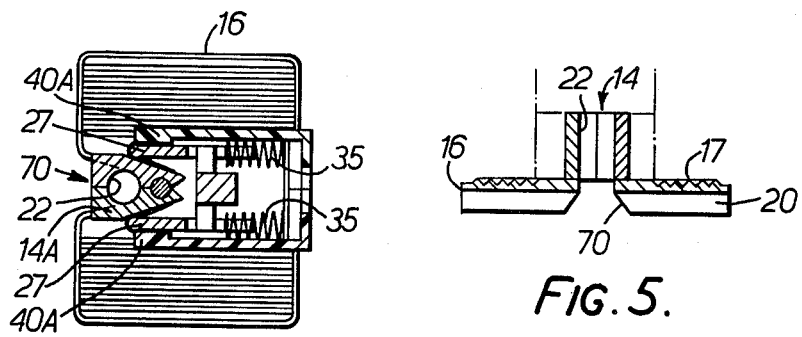
FIG. 4.
FIG. 5.
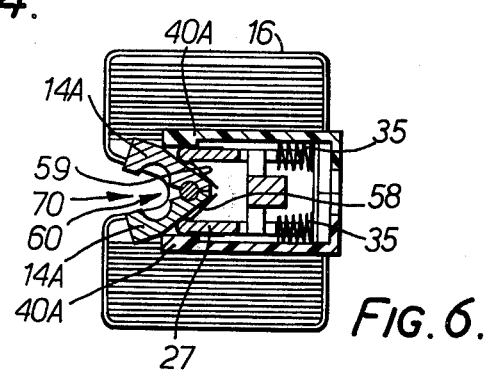
FIG. 6.

DRILL GUIDES

BACKGROUND OF THE INVENTION

1. Field of the Invention

This invention relates to drill guides.

2. Description of the Prior Art

It is often found quite difficult accurately to locate the free end of a drill bit at the commencement of drilling on certain materials, particularly where these have a relatively smooth surface. This is particularly the case with tiles and plastic laminates where it is difficult to locate the free end of the drill accurately on the intended drilling point, owing for example to the difficulty if not impossibility of centre punching. Furthermore, it is sometimes difficult to maintain a drill bit in its intended alignment during the drilling of certain substances, for example with masonry, where the drill tends to wander where it engages parts of the masonry which are softer or harder than others. Similar problems arise when attempts are made to drill at an angle to the surface of the work. During drilling with a handheld electric drill, these problems often give the operator very considerable difficulty in obtaining correctly positioned, shaped, sized, and angle of holes in the workpiece, masonry or wall or other part to be drilled.

Proposals have been made for providing a guide for the drill bit, but these prior proposals have presented numerous difficulties. For example, it is often found extremely difficult to align and prevent slipping of the drill guide with respect to the intended drilling position. Furthermore, for drilling bits which include radially extending spades for masonry drilling there is, as far as is known no suitable drill guide.

The invention, therefore, has — as a principal object — the overcoming of some if not all of these disadvantages and of providing a construction which is relatively simple to operate, sturdy in construction and relatively inexpensive to manufacture by mass production methods.

SUMMARY OF THE INVENTION

According to the present invention, a drill guide includes a body having at least one abutment surface thereon, a handle for manually maintaining the abutment surface against a workpiece, locating means for any one of several differently dimensioned, manually interchangeable, guide sleeves each formed of at least two sleeve parts having an abutting closed condition and an at least partially separated open condition, the sleeve parts having longitudinally extending opposed guide surfaces which, in the said closed condition, define a longitudinal passage for guiding a drill bit of predetermined shank diameter into the workpiece, the sleeve parts being movable to the open condition while retained on the body to permit positioning of the passage around the drill bit by movement generally at right angles to the axis of the drill bit, the sleeve parts being arranged to move between said open and closed conditions upon the actuation of manually operable mechanism.

Conveniently, first spring means is included which biasses the sleeve parts to the open condition and secondary spring means may be included which bias the sleeve parts to the closed condition.

The manually operable mechanism may have first and second positions in the first of which the sleeve parts are biassed to their closed condition by said secondary spring means, and in the second of which, to which it is manually movable, against the bias of the secondary spring means, the manually operable mechanism permits the sleeve parts to be biassed to the said open condition by the first spring means.

Desirably, the sleeve parts are removable with respect to the said location means only when the manually operable mechanism is in its second position

DESCRIPTION OF THE DRAWINGS

The invention may be carried into practice in a number of ways but several specific embodiments will now be described by way of example with reference to the accompanying drawings, in which:

FIG. 3 is a longitudinal sectional side elevation in a vertical median plane of the construction of FIG. 1;

FIG. 4 is a sectional plan on the line 4—4 of FIG. 3 showing the guide sleeve in a closed position;

FIG. 5 is a sectional end elevation on the line 5—5 of FIG. 3;

FIG. 6 is a view similar to FIG. 4 but with the guide sleeve in an open condition;

DESCRIPTION OF THE PREFERRED EMBODIMENT

Figure 1:
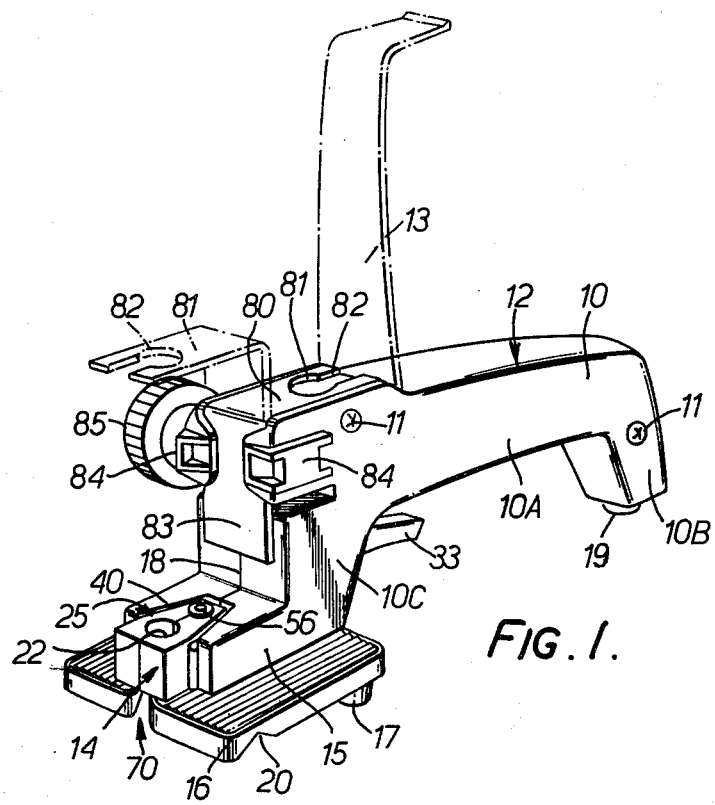
FIG. 1 is a perspective view from above and one end of a drill guide, according to the present invention, with a guide sleeve thereof in a closed condition.
Figure 2:
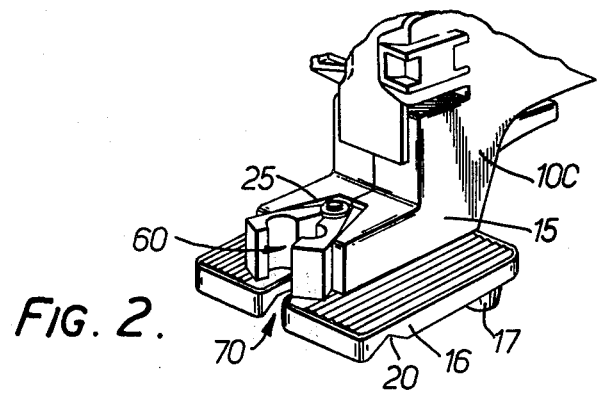
FIG. 2 is a scrap view similar to FIG. 1 but with the guide sleeve in an open condition.

Referring firstly to FIGS. 1–11, these illustrate a drill guide which includes a two-part handle 10, the two parts conveniently being formed as plastics mouldings. These two parts when secured together by screws 11 provide an upwardly facing storage recess 12 which can be closed by a lid 13. The storage recess can conveniently be used for storing a number of guide sleeves of different sizes. The handle includes a hand-grip 10A which interconnects a rear pillar 10B and a front pillar 10C. Extending forwardly from the lower end of the pillar 10C is an integral part 15, conveniently called "the head," and which, as will be described, serves to accommodate a removable guide sleeve 14.

Secured to the underside of the head 15 is a platform 16. The platform has an open-ended slot 70. Secured to the underside of the platform 16 are a pair of rubber or similar friction pads 17. The two pads 17 are spaced equidistantly from and on each side of the median vertical plane of the guide which also forms the plane of separation 18 of the two halves of the handle 10. Secured to the underside of the rear stem 10B is a further, single, pad 19 which lies symmetrically across the said median plane. The pads may be of varying shape but in the embodiment shown are circular. The centres of these circular pads lie on the apices of an isosceles triangle and together form three downwardly projecting feet affording abutments by which the device as a whole can be held rigidly by hand against a surface of a workpiece in which a hole is to be drilled. It is found that the triangular disposition referred to is particularly suitable for maintaining the device in a rigid position for drilling. It also enables the guide to be located on a convex surface which can project upwards for example into the region beneath the hand-grip 10A.

In some cases, it may be possible to secure the device to the work being drilled. This may, for example, be done by a number of clamps, for example G-clamps, which are conveniently secured to platform 16. The underside of the platform 16 has a transverse V-groove 20 therein which serves to locate the device on objects such as pieces of tube which are to be drilled. The top of the groove 20 defined by the line 21 in FIG. 8 extends at right angles to the median plane referred to and also passes across the extended axis of a bore 22 formed in the removable guide sleeve 14.

Figure 7:
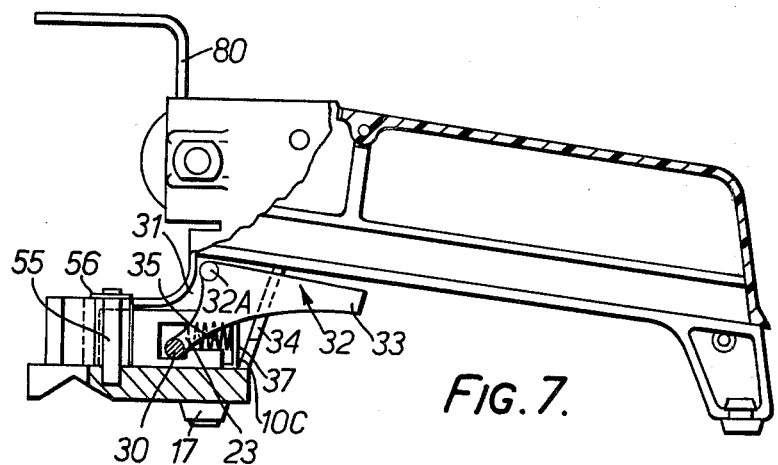
FIG. 7 is a view similar to FIG. 3 with the guide sleeve in an open position.
Figure 8:
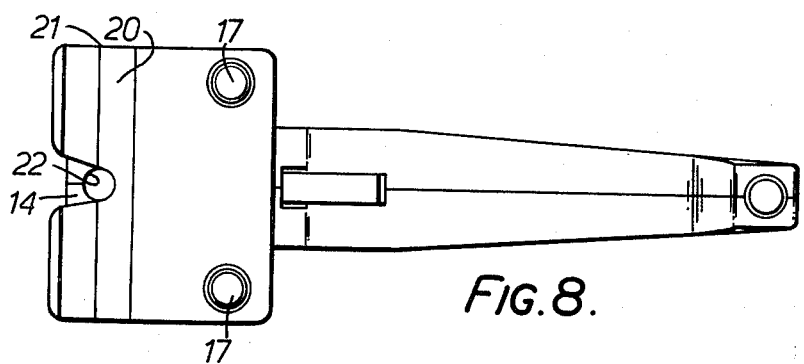
FIG. 8 is an under plan view with a guide sleeve in the closed condition.
Figure 10:
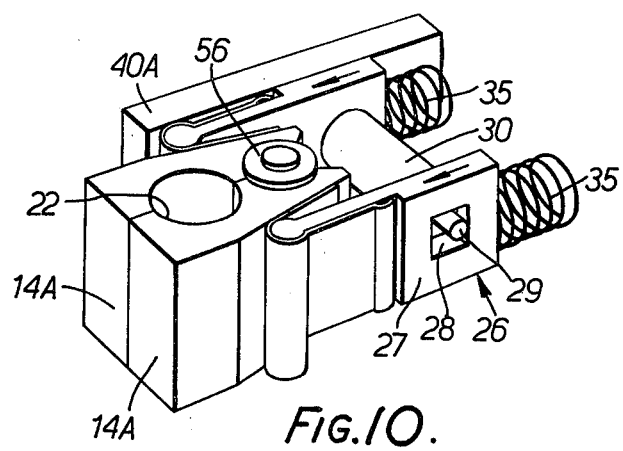
FIG. 10 shows certain parts of the device with the guide sleeve in a closed condition.
Figure 11:
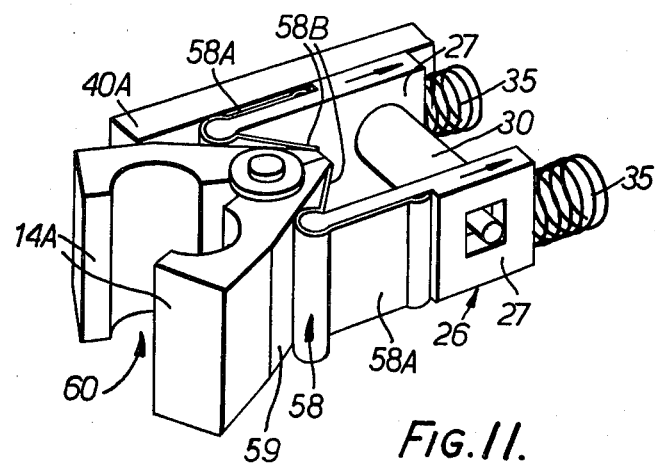
FIG. 11 is a view similar to FIG. 10 but with the guide sleeve in an open condition.

The head 15 is formed with a substantially rectangular open-ended recess 25 therein to receive, as a sliding fit, a sleeve actuator the detail of which is shown in FIGS. 10 and 11. The actuator includes a pair of rectilinearly movable wedges 27 having lost motion connections to a transverse bar 30 provided by slots 28 to receive pins 29. The bar 30 is connected, as shown in FIG. 7, to a nose portion 23 of an actuating lever 32 which is pivoted at 32A for movement about a horizontal axis within a space 31 formed in the pillar 10C. The lever 32 has a finger portion 33 projecting through a slot 34 formed in the pillar 10C.

The wedges 27 are biassed leftwards as viewed in FIGS. 7 and 10 by compression springs 35 extending between the wedges and a bracket 37.

The roof of the recess 25 in the head is formed with a cut-out opening 40 of the form shown in FIG. 1. Beneath the opening 40 the recess has, as shown in FIG. 4, a pair of substantially parallel walls 40A which provide location for the outside surfaces of the wedges 27.

The guide sleeve is formed in two identical halves, relatively cheaply produced in a two part die from sintered iron capable of withstanding the loads which are applied by a fast running drill bit when situated with little clearance in the bore 22 defined by the two halves of the sleeve.

Figure 9:
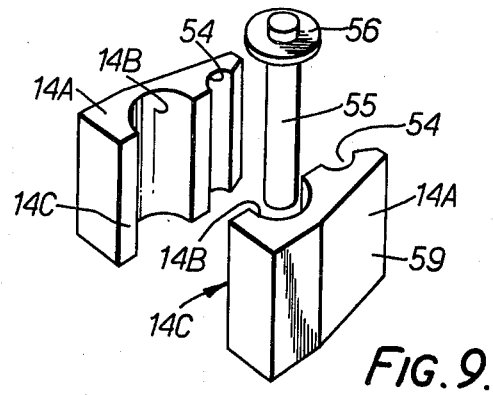
FIG. 9 is an exploded perspective view of the two parts of the guide sleeve of FIGS. 1–8.

FIG. 9 illustrates the form of guide sleeve included in the embodiment of FIGS. 1-8. Each half sleeve 14A defines a smooth walled semi-cylindrical recess 14B, the two recesses together defining the bore 22 when the two halves are brought together. The same effect as a smooth bore 22 could be obtained with a ribbed or splined bore or even a pair of opposed V-grooves. Each half sleeve 14A affords a pair of co-planar abutment surfaces 14C which abut corresponding abutment surfaces on the other half sleeve when the two halves are in their closed position.

Towards their right-hand ends, the half sleeves 14A have semi-cylindrical bearing recesses 54 which together surround a post 55 having a collar 56 at its upper end, the lower end being permanently mounted in the platform 16 as shown in FIG. 7. The two half sleeves 14A are retained on the post 55 by a pair of leaf springs 58 shown in FIGS. 10 and 11, for example. These leaf springs have outer limbs 58A located between the wedges 27 and the walls 40A and inner limbs 58B bearing on tapered side walls 59 of the half sleeves 14A to bias them towards the open condition as shown in FIG. 11 in which they provide an opening or jaw 60. The leaf springs may be produced from a suitable hardened spring metal which has an advantage in that they will protect the wedges from rubbing or wear from masonry dust.

To enable the parts to reach the FIG. 11 condition in which the half sleeves 14A are open, the lever 32 is raised to the FIG. 7 position in order to move the wedges 27 to the right against the bias of the springs 35. Normally, the springs 35 maintain the wedges to the left in the position shown in FIG. 10, the springs 35 together with the non-reversibility and wedging ramp angles of the tapered side walls 59 being sufficiently strong to overcome the opening bias of the leaf springs 58.

Accordingly, when it is desired to use the drill guide, and assuming that the proper size of guide sleeve 14 is in position, the drill bit, held by the chuck of a drill, is aligned with an appropriate mark on the workpiece. Thereafter, the sleeve 14 is opened to the FIG. 11 condition so that the drill guide as a whole can be addressed to the drill bit by moving the slot 70 and the open jaw 60 around the drill bit. The lever 32 can thereafter be gradually released so that the half-sleeves 14A move to the closed position of FIG. 10 so completely surrounding the drill bit and provide an accurate guide for drilling purposes. During drilling, any loads tending to open or move the half-sleeves 14A will be satisfactorily taken up by the wedges 27, the platform 16 and the post 55. When drilling is completed, the jaw 60 is reopened by lifting the lever 32, and the drill guide removed from the vicinity of drilling. The jaw can readily be opened temporarily during drilling in order to check progress. It is to be noted, particularly from FIG. 7, that the guide sleeve and the platform 16 are spaced from the workpiece by the circular pads 17 and 18 so that swarf can clear itself from the drilled hole during operation by movement sideways beneath platform 16. This gap also enables the device to be used with drills having masonry spades since these are of a larger diameter than the drill shank.

Figure 12:
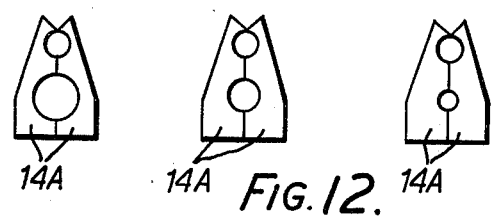
FIG. 12 shows three differently dimensioned guide sleeves for use with differently diametered drill bits.

When it is desired to change the guide sleeve, the two half-sleeves 14A can be detached one at a time whilst the parts are in the FIG. 11 condition. Thus, by exerting a slight twist and pull to one half of the guide sleeve 14A, it can be released from the post 55 during which time slight compression of the limb 58B of the leaf springs occurs. Assembly of different sized sleeves, for example as shown in FIG. 12, is carried out be inserting the halves one at a time in a FIG. 11 condition.

It is to be noted that the wedges 27 and the forward ends of the walls 40A terminate short of the forward ends of the half sleeves 14A. This enables the half sleeves to be readily gripped during removal. In this embodiment the half sleeves, being separate from one another and the post 55, after removal, can readily be cleaned of masonry or other dust. It is also to be noted that the length of the half sleeves can be increased as the bore diameter increases so as to provide adequate drill support.

The handle carries an L-shaped depth stop 80. A horizontal limb 81 having a keyhole slot 82, in a storage position, lies snugly on top of the handle whilst a vertical limb 83 extends down the forward face of the handle pillar 10C and is gripped by a pair of gripping portions 84 of the handle. These gripping portions are drawn together by means of a knob 85. To use the depth stop, it is released from the gripping portions 84 and the vertical limb 83 reversed so that the horizontal limb 81 extends forwards as shown in chain dotted lines. The depth stop may be inserted as shown, or may be inverted to locate the horizontal limb almost on top of the guide sleeve. The height at which the horizontal limb 81 is set and gripped by means of the knob 82 determines the depth to which the chuck of a drill carrying the drill bit can extend during drilling operations. In this way, the depth stop can be set to determine the depth to which the drill bit extends into the workpiece.

Figure 13:
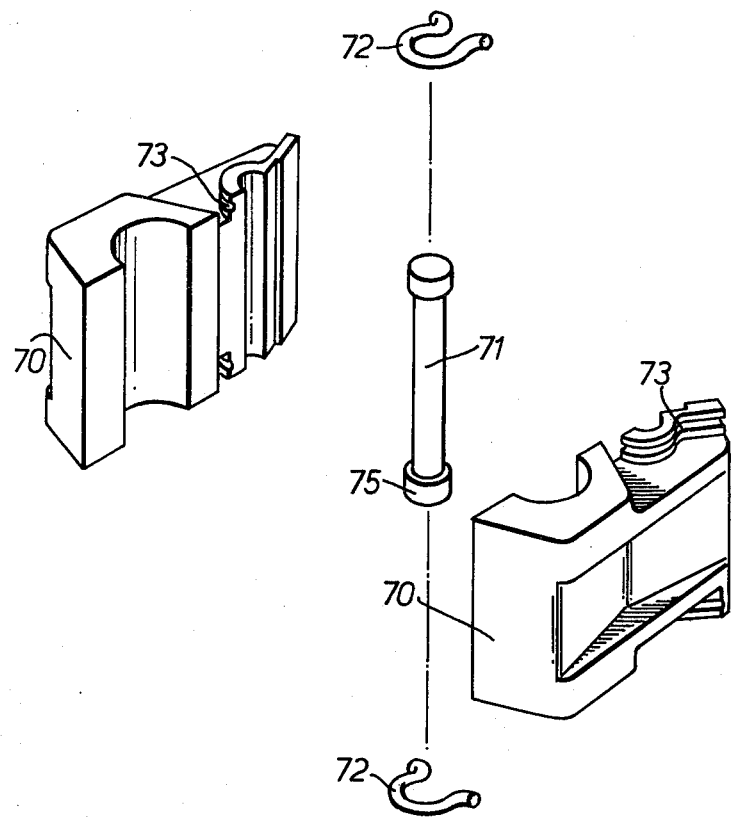
FIG. 13 illustrates an alternative form of guide sleeve construction.

FIG. 13 illustrates an alternative construction in which two half sleeves 70 are retained on a removable post 71 by a pair of spring clips 72 which engage around grooved shoulders 73 on the half sleeves. The spring clips tend to open the half sleeves and serve the same function as the leaf springs of the first embodiment. To remove the unitary construction of FIG. 13 from the remainder of the device, similar wedges are simply withdrawn and the guide sleeve bodily removed. The lower end of the post 71 has a shoulder 75 which is received in a hole in the platform of the device for locating the guide sleeve accurately in its operative position.

WHAT I claim as my invention and desire to secure by Letters Patent is:

1. A drill guide including a body having at least one abutment surface thereon, said body including a handle for manually maintaining the abutment surface against a workpiece, locating means retained on said body for selectively receiving one of several differently dimensioned guide sleeves, each of said guide sleeves being formed of at least two sleeve parts, said sleeve parts being positionable in an abutting closed position and in an at least partially separated open position, said sleeve parts having longitudinally extending opposed guide surfaces which, in said closed position, define a longitudinal passage for guiding a drill bit of predetermined shank diameter into the workpiece, said sleeve parts being movable to the open condition while being retained on the body to permit positioning of the passage around the drill bit by movement generally at right angles to the axis of the drill bit, and manually operable actuating means for moving said sleeve parts between said open and closed positions.

2. A drill guide as claimed in claim 1 including first spring means biassing the sleeve parts to the open condition.

3. A drill guide as claimed in claim 2 including secondary spring means biassing the sleeve parts to the closed condition.

4. A drill guide as claimed in claim 3 in which the manually operable actuating means has first and second positions, in the first position the sleeve parts are biassed to their closed position by said secondary spring means, and in the second positions the sleeve parts are biassed to said open position by the first spring means.

5. A drill guide as claimed in claim 4 wherein the sleeve parts are removable with respect to said locating means only when the manually operable actuating means is in its second position.

6. A drill guide as claimed in claim 5 wherein the sleeve parts are removable and insertable one at a time by movement which includes movement against the bias of the secondary spring means.

7. A drill guide as claimed in claim 5 in which the sleeve parts are removable together as a unit.

8. A drill guide as claimed in Claim 1 wherein the manually operable actuating means incorporates a wedging action to hold the sleeve parts in the closed condition.

9. A drill guide as claimed in claim 1 in which said abutment surface includes a plurality of coplanar friction pads.

10. A drill guide as claimed in claim 9 in which the handle includes front and rear handle portions each carrying at least one of the friction pads, and an intermediate handgrip portion interconnecting the handle portions.

11. A drill guide as claimed in claim 10 in which the front handle portion carries the locating means for the guide sleeves and clamping platforms being disposed on each side of the locating means.

12. A drill guide as claimed in claim 1 wherein the body is provided with at least one pipe-locating groove, the locating means positioning the axis of said guide sleeve such that the axis thereof intersects the pipe locating groove.

13. A drill guide as claiamed in claim 1 in which the body carries adjustable depth-stop means for determining the depth of insertion of the drirll bit into the workpiece.

14. A drill guide as claimed in claim 13 in which the depth-stop is carried on the handle.

15. A drill guide as claimed in claim 1 in which the manually operable actuating means includes a control member located adjacent the handle so as to be capable of operation by the same hand as is holding the handle.

16. A drill guide as claimed in claim 1, in which the guide sleeve, when received by the locating means, is disposed in spaced relation to the abutment surface such that when the abutment surface is manually held against a substantially flat planar workpiece, a gap exists between the workpiece and the guide sleeve.

17. A drill guide as claimed in claim 1, in which the guide sleeves are formed from sintered material.

18. A drill guide as claimed in claim 1, including storage means in the handle.

* * * * *